United States Patent
Asoma

(10) Patent No.: US 8,885,093 B2
(45) Date of Patent: Nov. 11, 2014

(54) IMAGE PICKUP APPARATUS, IMAGE PICKUP METHOD, EXPOSURE CONTROL METHOD, AND PROGRAM

(75) Inventor: Akira Asoma, Kanagawa (JP)

(73) Assignee: Sony Corporation, Tokyo (JP)

( * ) Notice: Subject to any disclaimer, the term of this patent is extended or adjusted under 35 U.S.C. 154(b) by 1452 days.

(21) Appl. No.: 12/015,815

(22) Filed: Jan. 17, 2008

(65) Prior Publication Data

US 2008/0284872 A1    Nov. 20, 2008

(30) Foreign Application Priority Data

Mar. 14, 2007    (JP) ................. 2007-065230

(51) Int. Cl.
*H04N 5/238*   (2006.01)
*H04N 5/335*   (2011.01)

(52) U.S. Cl.
USPC .......................... 348/364; 348/297

(58) Field of Classification Search
USPC .............. 348/362, 364, 365, 367, 345, 220.1, 348/221.1, 223.1, 229.1, 36, 217.1, 235
See application file for complete search history.

(56) References Cited

U.S. PATENT DOCUMENTS

| | | | |
|---|---|---|---|
| 5,455,621 A | | 10/1995 | Morimura |
| 6,670,793 B1 * | | 12/2003 | Cornick et al. ............... 323/207 |
| 6,670,993 B1 * | | 12/2003 | Yamamoto et al. ........... 348/362 |
| 7,298,402 B2 * | | 11/2007 | Horiuchi .................... 348/229.1 |
| 7,755,664 B2 * | | 7/2010 | Kakinuma et al. ........ 348/208.1 |
| 2003/0095192 A1 * | | 5/2003 | Horiuchi .................... 348/222.1 |
| 2004/0218830 A1 | | 11/2004 | Kang et al. |
| 2006/0033823 A1 | | 2/2006 | Okamura |

FOREIGN PATENT DOCUMENTS

| | | |
|---|---|---|
| EP | 0 725 536 A2 | 8/1996 |
| EP | 0 866 608 A2 | 9/1998 |
| EP | 0 930 780 A1 | 7/1999 |
| JP | 6-141229 | 5/1994 |
| JP | 2002-84449 | 3/2002 |
| JP | 2003-46859 | 2/2003 |
| JP | 2003-158673 | 5/2003 |
| JP | 2003-174582 | 6/2003 |
| JP | 2004-048263 | 2/2004 |
| JP | 2004-120205 | 4/2004 |
| JP | 2004-186876 | 7/2004 |

OTHER PUBLICATIONS

U.S. Appl. No. 12/509,741, filed Jul. 27, 2009, Asoma.
U.S. Appl. No. 12/190,800, filed Aug. 13, 2008, Asoma.

(Continued)

*Primary Examiner* — Ahmed A Berhan
(74) *Attorney, Agent, or Firm* — Oblon, Spivak, McClelland, Maier & Neustadt, L.L.P.

(57) ABSTRACT

An image pickup apparatus includes: an image pickup unit configured to generate a long-exposure image signal and a short-exposure image signal from incident light and output the generated signals as image pickup signals, the long-exposure image signal being generated by exposure for a relatively long period and the short-exposure image signal being generated by exposure for a relatively short period; a signal processing unit configured to generate a combined image signal by combining the long-exposure image signal and the short-exposure image signal, the combined image signal having a dynamic range that is relatively wider than that of at least any one of the long-exposure image signal and the short-exposure image signal; a detection unit configured to obtain a luminance integrated value and a luminance histogram of the combined image signal; and a control unit configured to perform exposure correction control using the luminance integrated value and the luminance histogram.

20 Claims, 14 Drawing Sheets

(56) References Cited

OTHER PUBLICATIONS

U.S. Appl. No. 12/188,580, filed Aug. 8, 2008, Asoma.
U.S. Appl. No. 12/195,493, filed Aug. 21, 2008, Asoma.

Extended European Search Report issued Mar. 25, 2011, in Application No. / Patent No. 08152650.1-2202 /1971137.

* cited by examiner

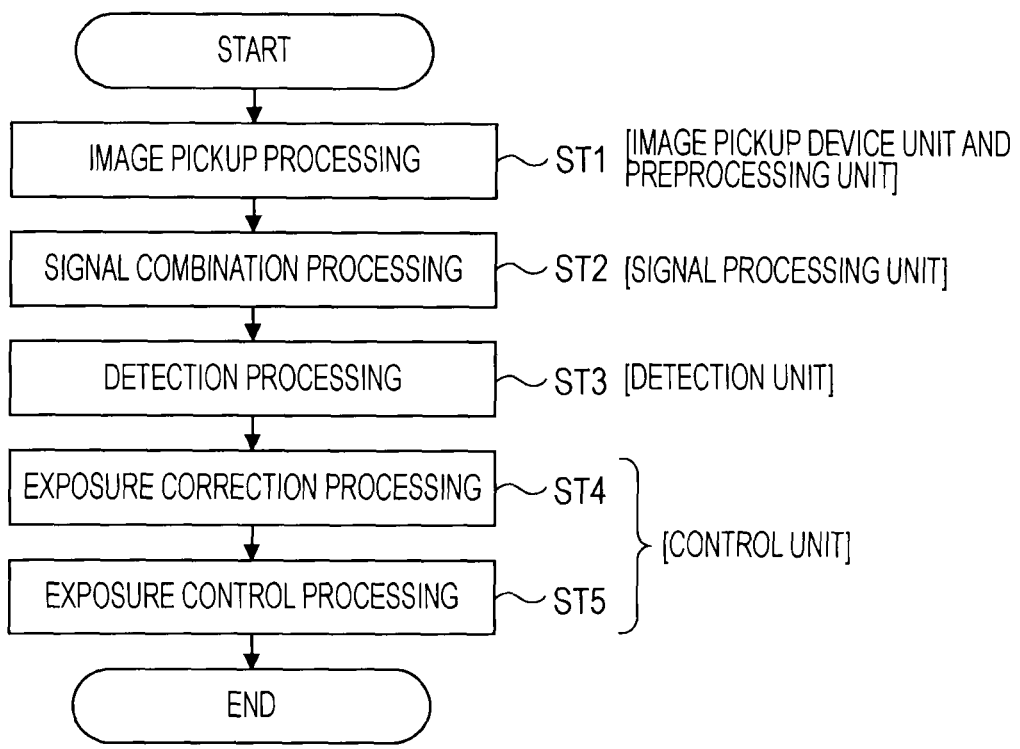
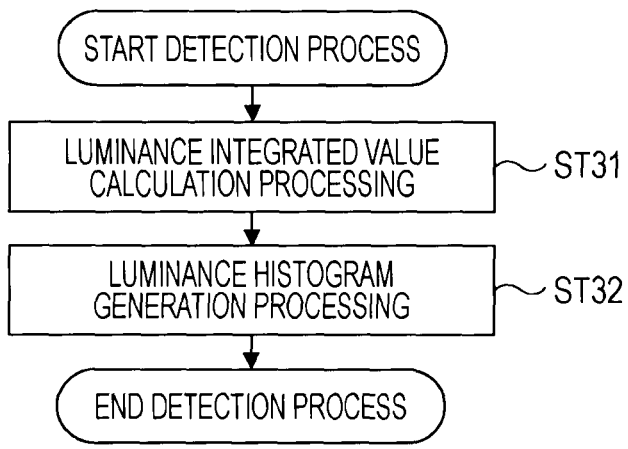

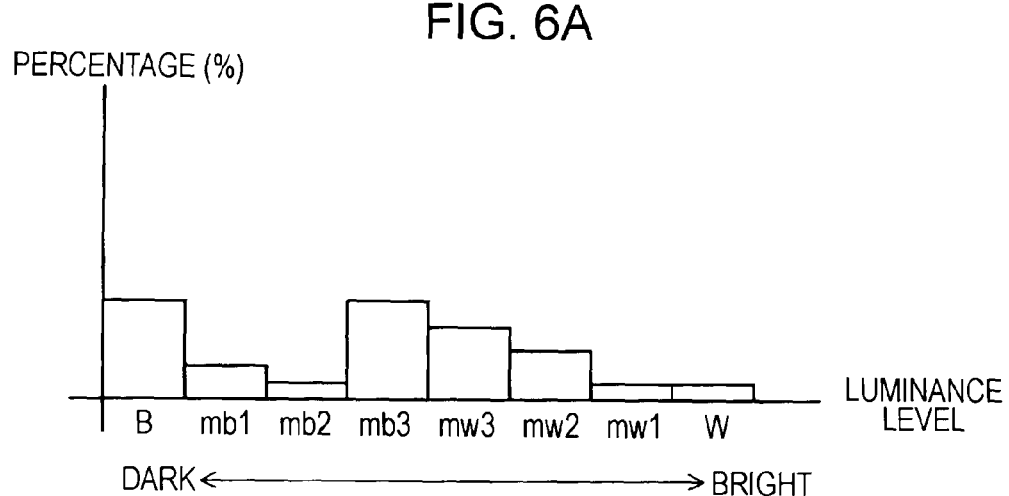
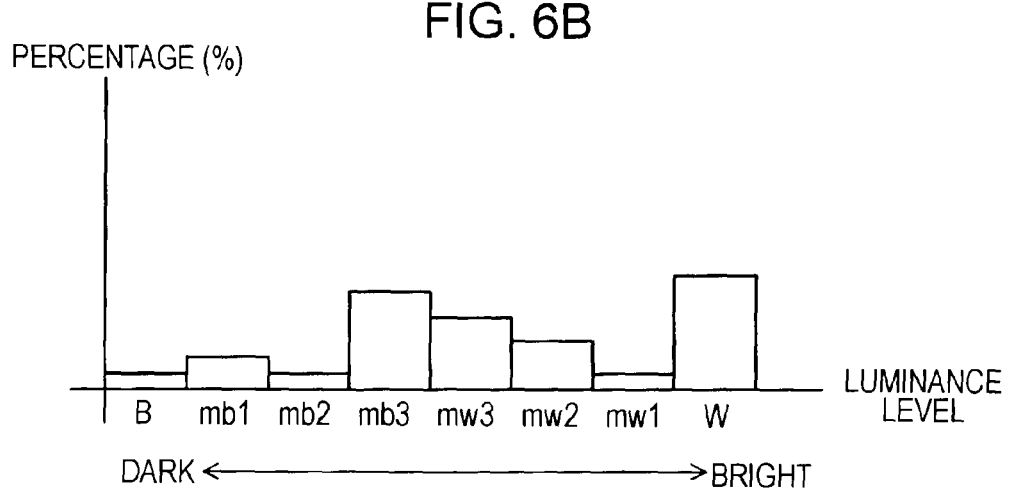

IMAGE PICKUP APPARATUS, IMAGE PICKUP METHOD, EXPOSURE CONTROL METHOD, AND PROGRAM

CROSS REFERENCES TO RELATED APPLICATIONS

The present invention contains subject matter related to Japanese Patent Application JP 2007-065230 filed in the Japanese Patent Office on Mar. 14, 2007, the entire contents of which are incorporated herein by reference.

BACKGROUND OF THE INVENTION

1. Field of the Invention

The present invention relates to image pickup apparatuses, image pickup methods, exposure control methods, and programs, and, more particularly, to exposure correction in which an image pickup apparatus generates a combined image signal with a wide dynamic range by combining a long-exposure image signal and a short-exposure image signal.

2. Description of the Related Art

In many image pickup apparatuses using a solid-state image pickup device such as a CCD (Charge Coupled Device), the quantity of light to be input into the image pickup device (light quantity of exposure) is controlled by controlling an aperture and an electronic shutter speed. That is, when a bright scene is captured, the light quantity of exposure is reduced so as to prevent the occurrence of overexposure that is caused by saturation of a signal output from an image pickup device. Conversely, when a dark scene is captured, the light quantity of exposure is increased so as to prevent the occurrence of underexposure.

However, when a scene with a strong contrast is desired to be captured (image capturing of a backlit subject or simultaneous image capturing of an indoor scene and an outdoor scene) using a solid-state image pickup device with an insufficient dynamic range, even if light quantity of exposure is controlled, overexposure may occur in a bright portion of the scene due to the saturation of the bright portion and underexposure may occur in a dark portion of the scene. As a result, both of these portions cannot be appropriately reproduced.

As a method of overcoming such a difficulty, Japanese Unexamined Patent Application Publication No. 6-141229 (corresponding U.S. Pat. No. 5,455,621) discloses a method of separately obtaining bright area information and dark area information by using two different electronic shutter speeds in a field or changing an electronic shutter speed for each field, and combining the obtained pieces of information into a single image. This method is employed by apparatuses capable of capturing an image with a wide dynamic range (wide dynamic range cameras). In addition, Japanese Unexamined Patent Application Publication Nos. 2004-120205 (corresponding patent No. US 2006/033823 A1) and 2002-84449 disclose apparatuses and methods for improving the quality of the above-described combined image.

SUMMARY OF THE INVENTION

In the case of such methods of improving image quality of a wide dynamic range camera by improving the method of combining images captured with two significantly different light quantities of exposure, however, it is not checked whether an image obtained by combining these images is an image including no overexposed portion or no underexposed portion. Accordingly, if there is an overexposed portion or an underexposed portion is included in the combined image, the portion is not corrected and a combined image of unacceptable quality is therefore generated. It is desirable to provide a method capable of more effectively correcting an overexposed portion or an underexposed portion included in a combined image.

An image pickup apparatus according to an embodiment of the present invention includes: an image pickup unit configured to generate a long-exposure image signal and a short-exposure image signal from incident light and output the long-exposure image signal and the short-exposure image signal as image pickup signals, the long-exposure image signal being generated by exposure for a relatively long period and the short-exposure image signal being generated by exposure for a relatively short period; a signal processing unit configured to generate a combined image signal by combining the long-exposure image signal and the short-exposure image signal, the combined image signal having a dynamic range that is relatively wider than that of at least any one of the long-exposure image signal and the short-exposure image signal; a detection unit configured to obtain a luminance integrated value of the combined image signal and generate a luminance histogram of the combined image signal; and a control unit configured to perform exposure correction control for the image pickup unit using the luminance integrated value and the luminance histogram.

The control unit detects occurrence of underexposure in the combined image signal using the luminance histogram, sets a target luminance integrated value on the basis of a detection result, and performs the exposure correction control for the image pickup unit using the target luminance integrated value. In particular, the control unit performs the exposure correction control for the long-exposure image signal generated by the image pickup unit using the target luminance integrated value. Furthermore, the control unit performs iris correction, long-exposure period correction, or gain correction for the long-exposure image signal as the exposure correction control for the long-exposure image signal. The control unit detects occurrence of overexposure in the combined image signal using the luminance histogram, sets a short-exposure period on the basis of a detection result, and performs the exposure correction control for the short-exposure image signal generated by the image pickup unit using the short-exposure period.

The control unit performs both of the exposure correction control for elimination of an underexposed portion and the exposure correction control for elimination of an overexposed portion in each image signal unit period (for example, one field period or one frame period). Alternatively, the control unit performs any one of the exposure correction control for elimination of an underexposed portion and the exposure correction control for elimination of an overexposed portion in each image signal unit period. In this case, the control unit determines whether an exposure correction operation for elimination of an underexposed portion has been stably performed in each image signal unit period, performs the exposure correction control for elimination of an underexposed portion when it is determined that the exposure correction operation has not been stably performed, and performs the exposure correction control for elimination of an overexposed portion when it is determined that the exposure correction operation has been stably performed. The control unit counts the number of times the exposure correction control for elimination of an underexposed portion was performed, and performs the exposure correction control for elimination of an overexposed portion when the counted number exceeds a predetermined number.

The control unit sets a new target luminance integrated value by performing computation using a current target luminance integrated value and a fixed value. Alternatively, the control unit calculates a difference value required to obtain a convergence target value of the target luminance integrated value, and sets a new target luminance integrated value by performing computation using the current target luminance integrated value and the difference value. The detection unit classifies each of luminance levels of the luminance histogram into a black level, an intermediate level, or a white level and generates luminance distribution information about each of these levels, and the control unit uses the luminance distribution information about the intermediate level for setting of the target luminance integrated value. The control unit sets a new short-exposure period by performing computation using a current short-exposure period and a fixed value. Alternatively, the control unit calculates a difference value required to obtain a convergence target value of the short-exposure period, and sets the new short-exposure period by performing computation using the current short-exposure period and the difference value. The detection unit classifies each of luminance levels of the luminance histogram into a black level, an intermediate level, or a white level and generates luminance distribution information about each of these levels, and the control unit uses the luminance distribution information about the intermediate level for setting of the short-exposure period.

An image pickup method according to an embodiment of the present invention includes the steps of: generating a long-exposure image signal by exposure for a relatively long period and a short-exposure image signal by exposure for a relatively short period from incident light transmitted from a subject so as to output the long-exposure image signal and the short-exposure image signal as image pickup signals; generating a combined image signal by combining the long-exposure image signal and the short-exposure image signal, the combined image signal having a dynamic range that is relatively wider than that of at least any one of the long-exposure image signal and the short-exposure image signal; obtaining a luminance integrated value of the combined image signal and generating a luminance histogram of the combined image signal; and performing exposure correction control using the luminance integrated value and the luminance histogram.

An exposure correction method according to an embodiment of the present invention is a method for an image pickup apparatus for obtaining a long-exposure image signal by exposure for a relatively long period and a short-exposure image signal by exposure for a relatively short period, generating a combined image signal with a dynamic range that is relatively wider than that of at least any one of the long-exposure image signal and the short-exposure image signal by combining the long-exposure image signal and the short-exposure image signal, and outputting the generated combined image signal. The exposure correction method includes the steps of: obtaining a luminance integrated value of the combined image signal and generating a luminance histogram of the combined image signal; detecting occurrence of underexposure in the combined image signal from the luminance histogram; setting a target luminance integrated value on the basis of a detection result of the occurrence of the underexposure; detecting occurrence of overexposure in the combined image signal from the luminance histogram; setting a short-exposure period on the basis of a detection result of the occurrence of the overexposure; and performing exposure correction control using the target luminance integrated value and the short-exposure period. A program according to an embodiment of the present invention causes an image pickup apparatus to execute exposure correction. The image pickup apparatus is configured to obtain a long-exposure image signal by exposure for a relatively long period and a short-exposure image signal by exposure for a relatively short period, generate a combined image signal with a dynamic range that is wider than that of at least any one of the long-exposure image signal and the short-exposure image signal by combining the long-exposure image signal and the short-exposure image signal, and output the generated combined image signal. The exposure correction includes the steps of: obtaining a luminance integrated value of the combined image signal and generating a luminance histogram of the combined image signal; detecting occurrence of underexposure in the combined image signal from the luminance histogram; setting a target luminance integrated value on the basis of a detection result of the occurrence of the underexposure; detecting occurrence of overexposure in the combined image signal from the luminance histogram; setting a short-exposure period on the basis of a detection result of the occurrence of the overexposure; and performing exposure correction control using the target luminance integrated value and the short-exposure period.

In an embodiment of the present invention, a long-exposure image signal and a short-exposure image signal are obtained in a unit period, for example, one field period. A combined image signal is generated by combining these image signals. A luminance integrated value of the combined image signal is obtained and a luminance histogram (frequency distribution) of the combined image signal is analyzed. Using the obtained luminance integrated value and the analysis result, automatic exposure control (aperture control, electronic shutter speed control, and gain control) is performed as feedback control. Consequently, image quality of a wide dynamic range camera can be improved.

According to an embodiment of the present invention, a luminance integrated value of a combined image signal, which is generated by combining a long-exposure image signal and a short-exposure image signal, is obtained and a luminance histogram (frequency distribution) of the combined image signal is analyzed, and then exposure correction is performed using the obtained luminance integrated value and the analysis result. That is, it is determined whether underexposure or overexposure occurs in the combined image signal to be output as a final image visually checked by a user. The determination result is used for exposure correction as feedback information. Accordingly, the exposure correction can be effectively performed for elimination of an underexposed or overexposed portion on the final output image. That is, according to an embodiment of the present invention, the quality of a combined image can be improved with certainty. In addition, the exposure correction is performed using a combined image signal, and is not therefore affected by processing performed upon the long-exposure or short-exposure image signal before the combination of the image signals. A process performed before the image signal combination differs in various wide dynamic range camera systems. However, an embodiment of the present invention can be applied to various wide dynamic range camera systems regardless of such differences.

BRIEF DESCRIPTION OF THE DRAWINGS

FIG. 4 is a flowchart illustrating the operation of an image pickup apparatus according to an embodiment of the present invention;

FIG. 5 is a flowchart illustrating a detection process according to an embodiment of the present invention;

FIGS. 6A and 6B are diagrams describing a luminance histogram according to an embodiment of the present invention;

DESCRIPTION OF THE PREFERRED EMBODIMENTS

Embodiments of the present invention will be described below in the following order:
1. Summary of Wide Dynamic Range Camera;
2. Configuration of Image Pickup Apparatus;
3. Entire Operation of Image Pickup Apparatus;
4. Exposure Correction Process;
5. Another Example of Exposure Correction Process;
6. Another Example of Underexposure Correction;
7. Another Example of Overexposure Correction; and
8. Effect of Embodiment and Program.

1. Summary of Wide Dynamic Range Camera

An image pickup apparatus 1 according to an embodiment of the present invention is a wide dynamic range camera suitable for, for example, use as a surveillance camera. However, the dynamic range camera can be used as a digital still camera or a digital video camera targeted for general use. First, the description of a wide dynamic range camera will be made.

It is difficult for commonly used image pickup apparatuses to handle a wide dynamic range between an extremely dark portion and an extremely bright portion in a scene. For example, a case is considered in which image capturing is performed in a room with a view during the daytime on a sunny day. At that time, if exposure is performed after a subject in the room has been set as an exposure reference point, the outdoor portion outside the room loses gradation and is overexposed. Conversely, if exposure is performed after the outdoor portion has been set as an exposure reference point, the subject in the room is underexposed. That is, if there is a large difference between luminance levels in a scene, it is difficult to obtain a captured image corresponding to the luminance dynamic range.

Figure 2:
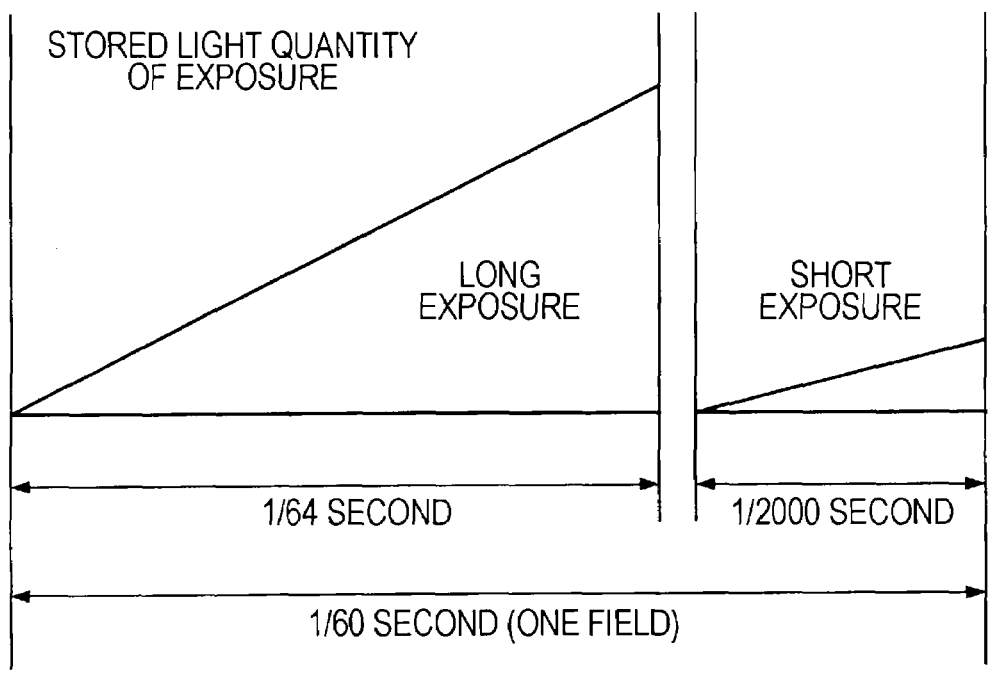
FIG. 2 is a diagram describing long exposure according to an embodiment of the present invention and short exposure according to an embodiment of the present invention.

On the other hand, a wide dynamic range camera according to an embodiment of the present invention obtains a captured image including no overexposed or underexposed portion by changing an electronic shutter speed each time an image is captured so as to change an exposure period and combining images that have been obtained with different exposure periods. FIG. 2 illustrates the relationship between an exposure period in one field and the stored light quantity of exposure (the amount of electrical charge) in an image pickup device unit such as a CCD or CMOS (Complementary Metal Oxide Semiconductor) sensor array. In this embodiment, for example, a long exposure of 1/64 second and a short exposure of 1/2000 second are performed in one field period of 1/60 second. The exposure periods of the long exposure and the short exposure may be changed. By performing the long exposure and the short exposure, a long-exposure image signal and a short-exposure image signal are obtained in one field period. The obtained image signals are combined.

Figure 3:
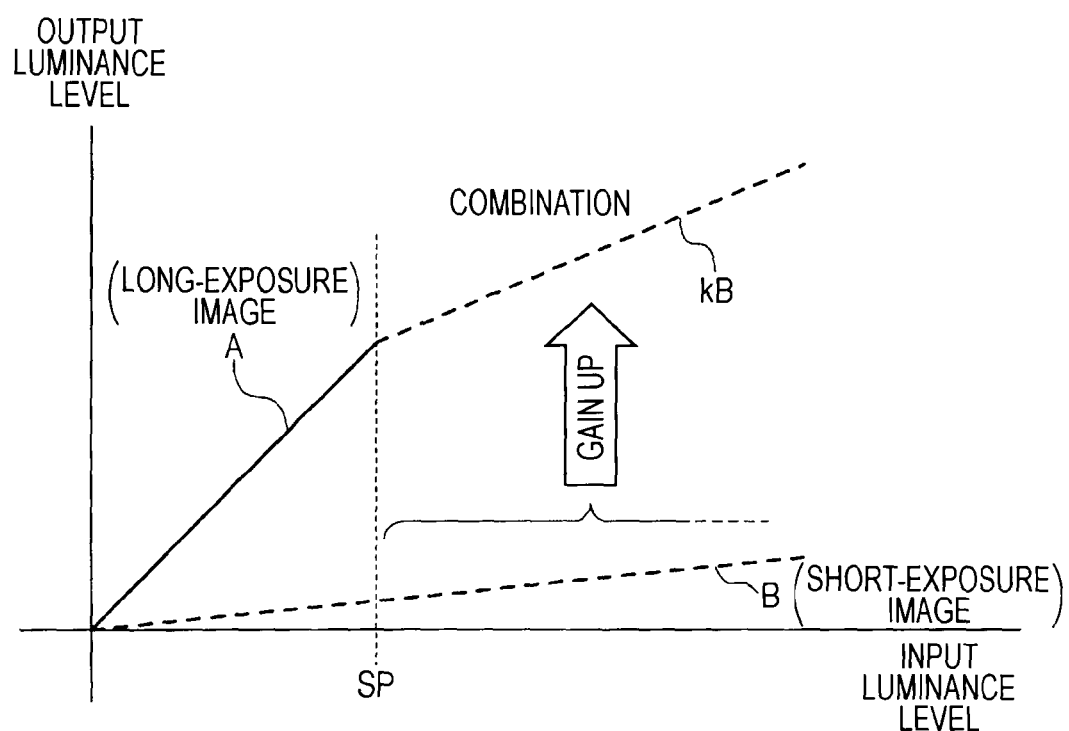
FIG. 3 is a diagram describing signal combination processing according to an embodiment of the present invention.

FIG. 3 illustrates an input-output luminance characteristic A of a long-exposure image signal and an input-output luminance characteristic B of a short-exposure image signal. In signal combination processing, for example, a predetermined luminance value is set as a switching point SP. A pixel having a luminance level lower than the switching point SP uses the long-exposure image signal as a pixel signal. On the other hand, a pixel having a luminance level higher than the switching point SP uses the short-exposure image signal as a pixel signal. At that time, the exposure ratio of the long-exposure image signal to the short-exposure image signal is multiplied by the short-exposure image signal, whereby the level adjustment of these image signals is performed. It is assumed that the exposure ratio of the long-exposure image signal to the short-exposure image signal is 10:1. In this case, the exposure level of the short-exposure image signal is one-tenth that of the long-exposure image signal. However, existing light quantity is at least ten times the luminance level of the short-exposure image signal. Accordingly, the short-exposure image signal is multiplied by the value of 10 for level adjustment. Thus, by performing a gain multiplication of the short-exposure image signal, a characteristic kB the level of which is adjusted to the characteristic of the long-exposure image signal can be obtained as illustrated in the drawing. Consequently, a combined image having a characteristic A-kB is generated. That is, the long-exposure image signal is used in a relatively dark portion in a scene so as to prevent the occurrence of underexposure and the short-exposure image signal is used in a relatively bright portion so as to prevent the occurrence of overexposure. Consequently, a combined image including no overexposed portion and no underexposed portion is generated.

As a method of capturing an image of a subject having a wide dynamic range between a bright portion and a dark portion, there are various methods other than the above-described method of combining a bright image and a dark image which have been obtained by changing an exposure period. For example, these various methods include a method of changing sensitivity on a pixel-to-pixel basis, extracting only signals having the same exposure conditions, reproducing an image using the extracted signals, and combining one or more images having different exposure conditions, and a method of separating incident light using a prism, and combining signals output from an image pickup device attached to a filter having a light reduction function such as an ND filter (Neutral Density filter: light quantity control filter) for reducing quantities of light of all wavelengths transmitted therethrough, that is, reducing the quantities of incident light equally.

Wide dynamic range cameras using one of the above-described methods have a dynamic range wider than that of commonly used video cameras, and can capture an image of a subject having a wide dynamic range. A subject having a wide dynamic range means that the output image of the subject includes a bright portion and a dark portion. Accordingly, such wide dynamic range cameras are suitable for image capturing performed in a room where strong light enters from outside or a place where there is a large difference between luminance levels. For example, such wide dynamic range cameras are suitable for use as cameras required to perform image capturing in a place where a dynamic range significantly differs in accordance with an image capturing time in the daytime or nighttime, for example, at the entrance of a bank or on a road where traffic conditions are monitored. In particular, they are suitable for use as monitoring cameras.

2. Configuration of Image Pickup Apparatus

Figure 1:
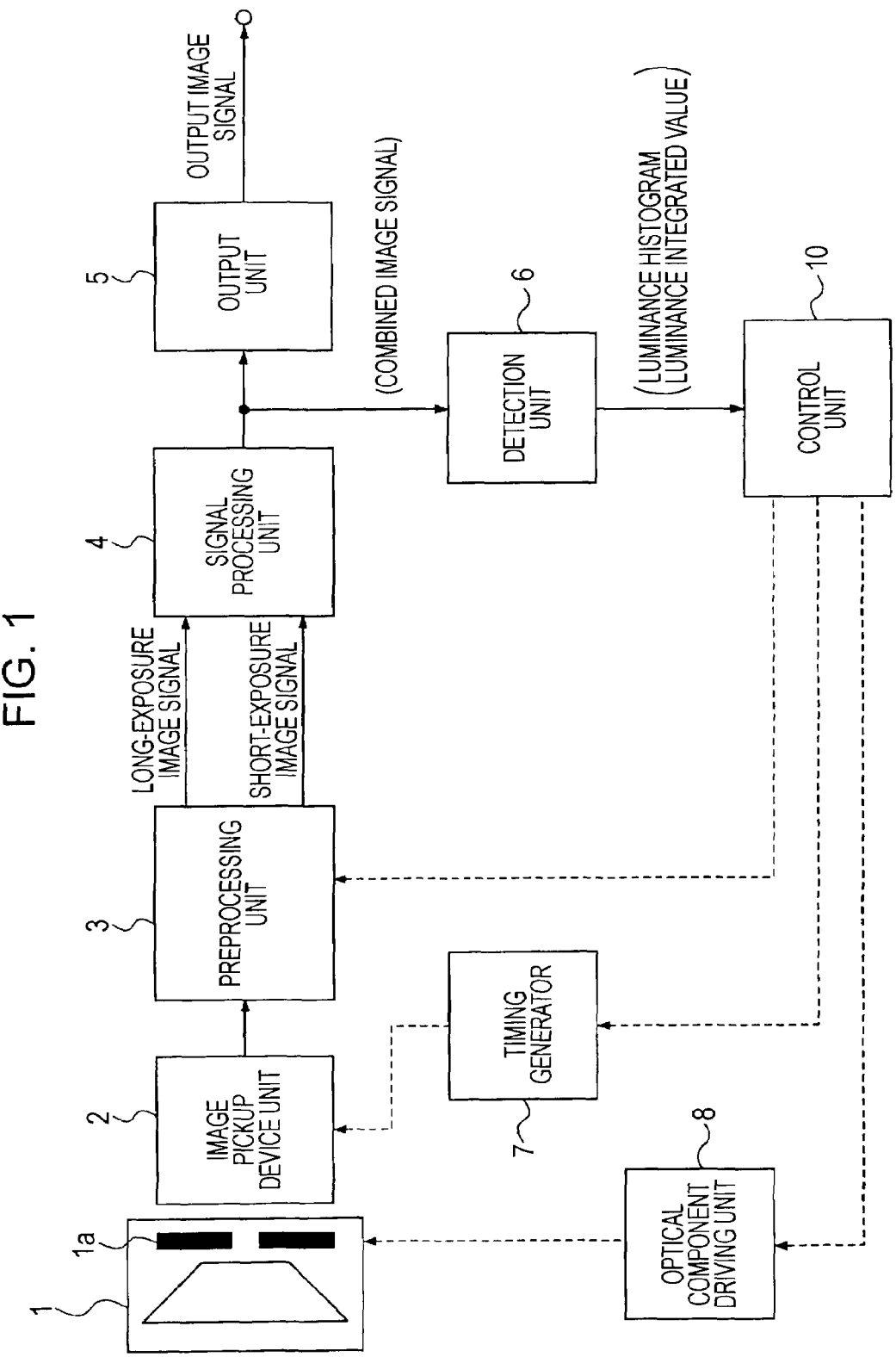
FIG. 1 is a block diagram of an image pickup apparatus according to an embodiment of the present invention.

FIG. 1 illustrates the configuration of an image pickup apparatus according to an embodiment of the present invention. An image pickup apparatus according to an embodiment of the present invention includes an image pickup optical system 1, an image pickup device unit 2, a preprocessing unit 3, a signal processing unit 4, an output unit 5, a detection unit 6, a timing generator 7, an optical component driving unit 8, and a control unit 10.

The image pickup optical system 1 includes optical components such as a lens, an optical filter for removing an unnecessary wavelength component, and an aperture 1a. Light is transmitted from a subject to the image pickup device unit 2 via each optical component included in the image pickup optical system 1. The image pickup device unit 2 is a solid-state image pickup device unit such as a CCD sensor array or a CMOS sensor array. The image pickup device unit 2 photoelectrically converts the light transmitted via the image pickup optical system 1 into an electric signal, and outputs the electric signal so as to generate a captured image. In this embodiment, the image pickup device unit 2 performs the above-described long exposure and the above-described short exposure in one field period, and outputs time-shared electric signals as the long-exposure image signal and the short-exposure image signal. The image pickup device unit 2 may not be a solid-state image pickup device unit, and may be a nonsolid-state image pickup device unit such as an image pickup tube. A nonsolid-state image pickup device can also perform the long exposure and the short exposure by using a mechanical shutter or a liquid crystal shutter. The preprocessing unit 3 that is a so-called Analog Front End performs CDS (Correlated Double Sampling) processing, gain processing using a programmable gain amplifier, and A/D conversion processing upon the electric signals used for generation of a captured image, and supplies the processed long-exposure image signal and the processed short-exposure image signal to the signal processing unit 4.

The signal processing unit 4 performs the signal combination processing described with reference to FIG. 3 upon the received long-exposure image signal and the received short-exposure image signal. That is, the signal processing unit 4 performs timing control and color balance correction upon the long-exposure image signal and the short-exposure image signal which have been supplied in accordance with a time-sharing method, performs gain processing so as to make the luminance level of the short-exposure image signal conform to that of the long-exposure image signal, and performs signal combination of these image signals. In addition, the signal processing unit 4 also performs gamma correction and white balance control upon the combined image signal, and outputs the processed combined image signal to the output unit 5 and the detection unit 6.

The output unit 5 performs processing so as to display an image on a monitor display using the combined image signal transmitted from the signal processing unit 4 or so as to transmit the combined image signal to an external apparatus. The detection unit 6 analyzes the luminance level of the combined image signal transmitted from the signal processing unit 4, generates information about a luminance integrated value and information about a luminance histogram, and supplies these pieces of information to the control unit 10.

The control unit 10 is a microcomputer including, for example, a CPU (Central Processing Unit), a ROM (Read-Only Memory), a RAM (Random Access Memory), and a flash memory, and controls the entire operation of the image pickup apparatus. In this embodiment, the control unit 10 performs exposure correction processing at the time of image capturing. The ROM included in the control unit 10 stores a program causing the control unit 10 to execute control processing required for exposure correction that will be described later. The control unit 10 executes necessary computation and control processing using the pieces of information about the luminance integrated value and the luminance histogram which have been supplied from the detection unit 6.

The timing generator 7 generates an operating pulse for the image pickup device unit 2 that is, for example, a CCD. For example, the timing generator 7 generates various pulses such as a four-phase pulse for vertical transfer, a field shift pulse, a two-phase pulse for horizontal transfer, and a shutter pulse, and supplies them to the image pickup device unit 2. The timing generator 7 can drive the image pickup device unit 2 (electronic shutter function). By controlling the driving of the image pickup device unit 2, as illustrated in FIG. 2, the long-exposure image signal obtained by exposure for a relatively long period and the short-exposure image signal obtained by exposure for a relatively short period can be output. These exposure periods required for the generation of the long-exposure image signal and the short-exposure image signal may be changed. The optical component driving unit 8 drives the optical components included in the image pickup optical system 1. In this embodiment, the optical component driving unit 8 is a driving circuit for driving at least the aperture 1a and controlling incident light.

3. Entire Operation of Image Pickup Apparatus

In the following, an exposure correction process performed in an image pickup apparatus according to an embodiment of the present invention will be described. First, the entire image capturing process performed in an image pickup apparatus, which includes the exposure correction process, will be described. FIG. 4 illustrates the image capturing process. The image capturing process illustrated in FIG. 4 is repeated at regular intervals, whereby an image generated using output video signals gradually approaches an image including no underexposed portion and no overexposed portion. Consequently, the image quality of a wide dynamic range camera is improved.

Step ST1: Image Pickup Processing

The timing generator 7 can set two different electronic shutter speeds, and causes the image pickup device unit 2 to perform the long exposure and the short exposure, which have been described with reference to FIG. 2, in one field period. Consequently, two image pickup signals having different light quantities of exposure (a long-exposure image signal obtained by exposure for an exposure period of 1/64 second and a short-exposure image signal obtained by exposure for an exposure period of 1/2000 second) are obtained. As described previously, the long-exposure image signal and the short-exposure image signal are processed by the preprocessing unit 3, and are then supplied to the signal processing unit 4.

Step ST2: Signal Combination Processing

The signal processing unit 4 combines, using the method described with reference to FIG. 3, the long-exposure image signal and the short-exposure image signal which have been digitalized by the preprocessing unit 3 so as to generate a combined image signal with a wider dynamic range. This combined image signal is output from the output unit 5 so as to be displayed on, for example, a monitor display.

Step ST3: Detection Processing

The combined image signal is also supplied to the detection unit 6. The detection unit 6 obtains a luminance integrated value of the combined image signal, generates a luminance histogram of the combined image signal, and transmits them to the control unit 10 on a field-by-field basis. FIG. 5 illustrates a detection process performed by the detection unit 6. In step ST31, the detection unit 6 calculates a luminance integrated value of a combined image signal of one field. In step ST32, the detection unit 6 generates a luminance histogram. FIGS. 6A and 6B illustrate examples of the luminance histogram. In these examples, the luminance level are classified into eight luminance levels, a black level (B), levels (mb1), (mb2), (mb3), (mw3), (mw2), and (mw1), and a white level (W). Each of these exemplary luminance histograms illustrates the percentages (%) of the eight luminance levels in a one-field image. For example, FIG. 6A illustrates an example of a luminance histogram of a relatively dark one-field image obtained from a combined image signal, and FIG. 6B illustrates an example of a luminance histogram of a relatively bright one-field image.

Step ST4: Exposure Correction Processing

The control unit 10 checks the luminance histogram, and determines a target luminance integrated value and a short-exposure period so that an image including no underexposed portion and no overexposed portion can be generated. In underexposure correction, an underexposed portion is detected by checking the percentage of the black level (B) in the luminance histogram, and the target luminance integrated value is set so that the percentage of the black level (B) can be set to a predetermined value. In overexposure correction, an overexposed portion is detected by checking the percentage of the white level (w) in the luminance histogram, and the short-exposure period is set so that the percentage of the white level (W) can be set to a predetermined value.

Step ST5: Exposure Control Processing

The control unit 10 performs exposure control processing using the target luminance integrated value and the short-exposure period which have been determined in the above-described exposure correction processing. The long-exposure light quantity used for underexposure correction is set as follows. First, the amounts of control required for settings of the aperture ratio of the aperture 1a, the long-exposure period of the image pickup device unit 2, and the gain of the PGA (Programmable Gain Amplifier) included in the preprocessing unit 3 are calculated on the basis of the difference between the current luminance integrated value transmitted from the detection unit 6 and the target luminance integrated value set in the above-described exposure correction processing. Subsequently, the control unit 10 causes the optical component driving unit 8 to drive the aperture 1a, transmits information about the long-exposure period to the timing generator 7, and transmits information about the gain of the PGA to the preprocessing unit 3. All of these three control processing operations may not be performed. One or two of them may be performed. In the case of the short-exposure light quantity used for overexposure correction, the control unit 10 transmits information about the short-exposure period set in the above-described exposure correction processing to the timing generator 7 so as to change the short-exposure period of the image pickup device unit 2, whereby necessary light quantity of exposure can be obtained. The aperture ratio of the aperture 1a and the gain of the PGA also affect the short-exposure light quantity. However, the long-exposure image signal is a dominant component of the combined image signal. Accordingly, the aperture ratio of the aperture 1a and the gain of the PGA are used for the correction of the long-exposure light quantity. It should be noted that the aperture ratio of the aperture 1a and the gain of the PGA may be used for the correction of the short-exposure light quantity.

4. Exposure Correction Processing

Figure 7:
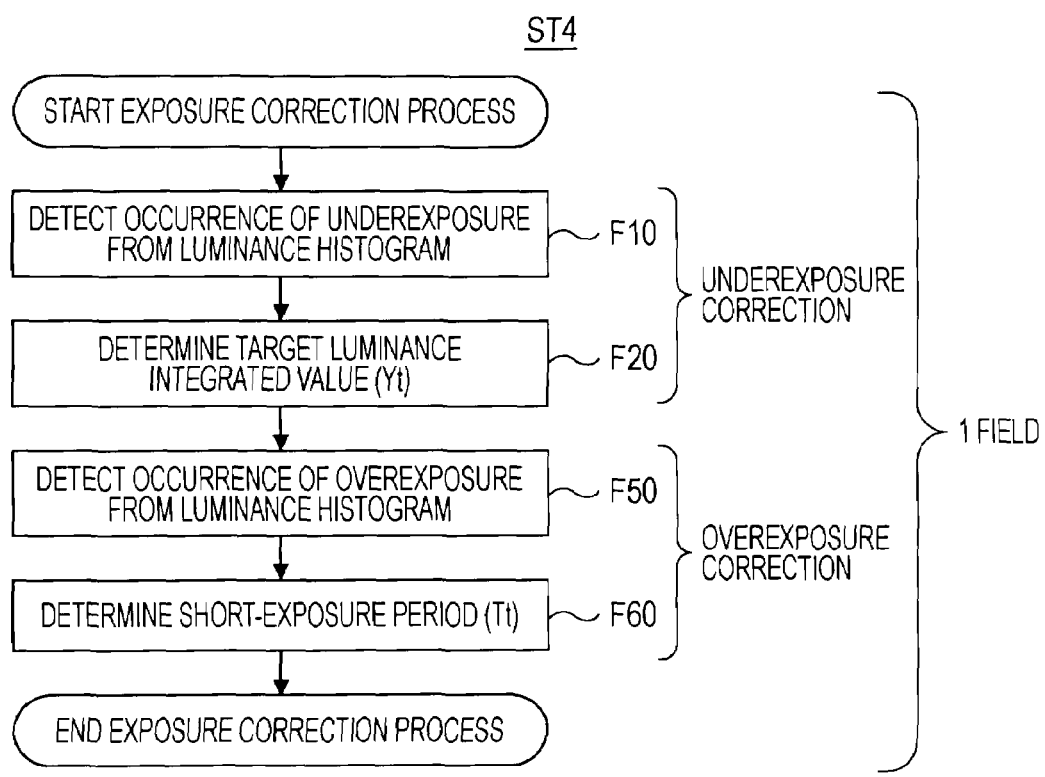
FIG. 7 is a flowchart illustrating an exposure correction process according to an embodiment of the present invention.

The exposure correction processing performed in step ST4 illustrated in FIG. 4 will be described in detail with reference to FIGS. 7, 8, and 9. In the exposure correction processing in step ST4, a process illustrated in FIG. 7 is performed in one field period. That is, in step F10, the control unit 10 checks the luminance histogram so as to detect whether underexposure occurs. In step F20, the control unit 10 determines a target luminance integrated value Yt. Thus, underexposure correction is performed in steps F10 and F20. In step F50, the control unit 10 checks the luminance histogram so as to detect whether overexposure occurs. In step F60, the control unit 10 determines a short-exposure period Tt. Thus, overexposure correction is performed in steps F50 and F60.

Figure 8:
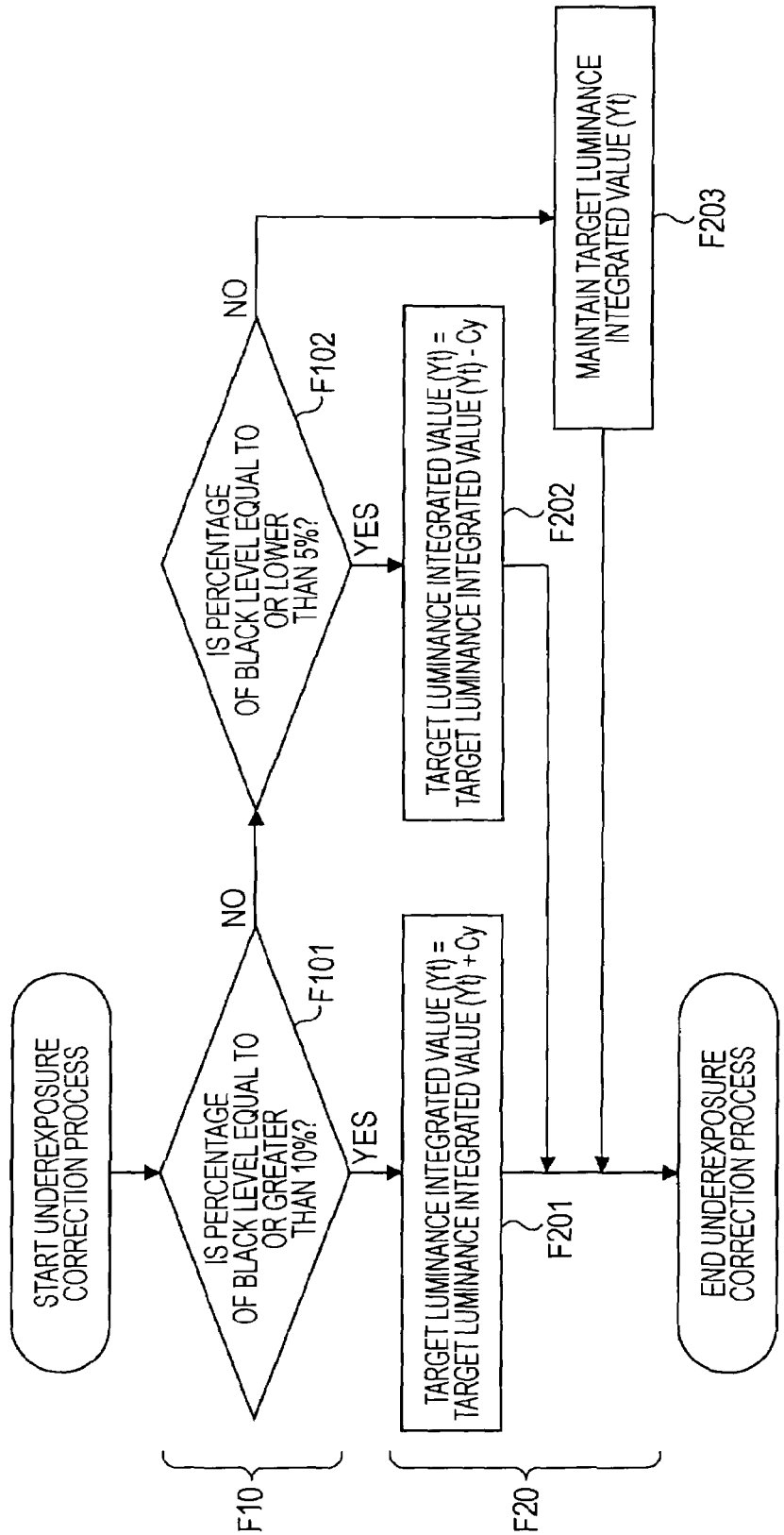
FIG. 8 is a flowchart illustrating an underexposure correction process according to an embodiment of the present invention.

FIG. 8 illustrates the underexposure correction performed in steps F10 and F20. As the processing for detecting whether underexposure occurs from the luminance histogram in step F10, the processing operations of steps F101 and F102 are performed. As the processing for determining the target luminance integrated value Yt in step F20, the processing operations of steps F201, 202, and 203 are performed. That is, first, in step F101, the control unit 10 determines whether the percentage of the black level (B) is equal to or greater than 10% in the luminance histogram. If the percentage of the black level (B) is equal to or greater than 10%, the control unit 10 determines that underexposure occurs in a combined image signal. Subsequently, the process proceeds to step F201 in which the control unit 10 updates the target luminance integrated value Yt with a value obtained by adding a fixed value Cy to the current target luminance integrated value Yt so as to increase the light quantity of exposure. On the other hand, if the percentage of the black level (B) is lower than 10%, in step F102, the control unit 10 determines whether the percentage of the black level (B) is equal to or lower than 5%. If the percentage of the black level (B) is equal to or lower than 5%, the process proceeds to step F202 in which the control unit 10 updates the target luminance integrated value Yt with a value obtained by subtracting the fixed value Cy from the current target luminance integrated value Yt so as to reduce the light quantity of exposure. On the other hand, if it is determined in step F102 that the percentage of the black level (B) is not equal to or lower than 5%, that is, is within the range of 5% to 10%, it is determined that an appropriate light quantity of exposure is set. Subsequently, the process proceeds to step F203 in which the current target luminance integrated value Yt is maintained.

Figure 9:
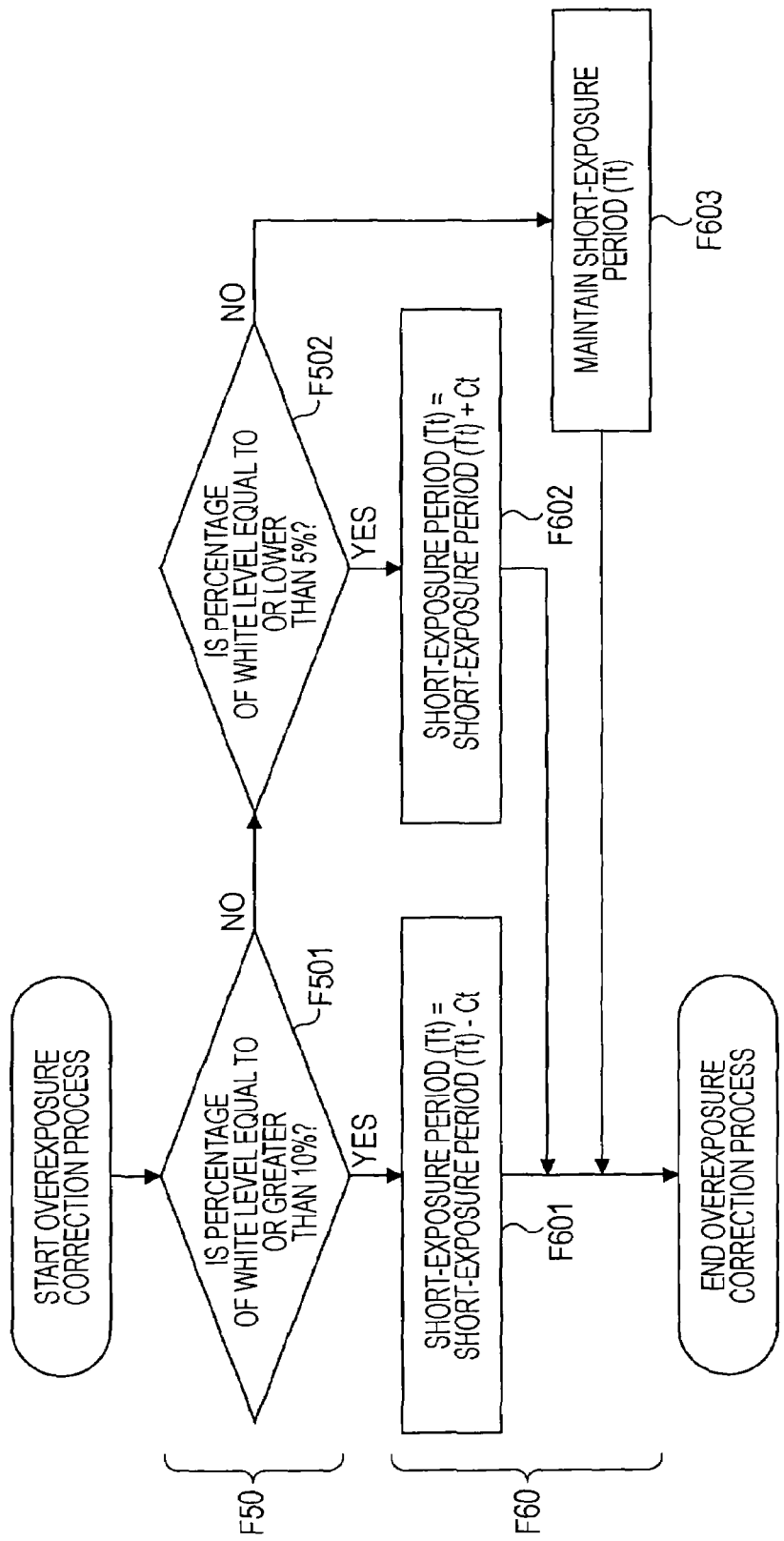
FIG. 9 is a flowchart illustrating an overexposure correction process according to an embodiment of the present invention.

FIG. 9 illustrates the overexposure correction performed in steps F50 and F60 illustrated in FIG. 7. As the processing for detecting whether overexposure occurs from the luminance histogram in step F50, the processing operations of steps F501 and F502 are performed. As the processing for determining the short-exposure period Tt in step F60, the processing operations of steps F601, F602, and F603 are performed. That is, first, in step F501, the control unit 10 determines whether the percentage of the white level (W) is equal to or greater than 10%. If the percentage of the white level (W) is equal to or greater than 10%, the control unit 10 determines that overexposure occurs in a combined image signal. Subsequently, the process proceeds to step F601 in which the control unit 10 updates the short-exposure period Tt with a value obtained by subtracting a fixed value Ct from the current short-exposure period Tt so as to reduce the light quantity of exposure. On the other hand, if the percentage of the white level (W) is lower than 10%, in step F502, the control unit 10 determines whether the percentage of the white level (W) is equal to or lower than 5%. If the percentage of the white level (W) is equal to or lower than 5%, the process proceeds to step F602 in which the control unit 10 updates the short-exposure period Tt with a value obtained by adding the fixed value Ct to the current short-exposure period Tt so as to increase the light quantity of exposure. On the other hand, if it is determined in step F502 that the percentage of the white level (W) is not equal to or lower than 5%, that is, is within the range of 5% to 10%, it is determined that an appropriate light quantity of exposure is set. Subsequently, the process proceeds to step F603 in which the current short-exposure period Tt is maintained.

Thus, the target luminance integrated value Yt and the short-exposure period Tt are determined. As described previously, using the target luminance integrated value Yt and the short-exposure period Tt, the exposure control processing is performed in step ST5 illustrated in FIG. 4. The process illustrated in FIG. 4 which includes the exposure correction processing (ST4) and the exposure control processing (ST5) is repeated in each field period. Consequently, exposure conditions that prevent the occurrence of underexposure and overexposure in a combined image signal are set. As illustrated in FIGS. 8 and 9, a new target integrated value is computed using a current target luminance integrated value and a fixed value and is then set, and a new short-exposure period is computed using a current short-exposure period and a fixed value and is the set. Consequently, the luminance level of a combined image signal is controlled while the light quantity of exposure is gradually changed.

5. Another Example of Exposure Correction Processing

In the exposure correction processing described with reference to FIG. 7, both of the exposure correction for elimination of an underexposed portion and the exposure correction for elimination of an overexposed portion are performed in each field period. However, only one of them may be performed in each field period. That is, both of the exposure correction for elimination of an underexposed portion and the exposure correction for elimination of an overexposed portion may not be performed at the same time in one field period. This case is illustrated in FIGS. 10 and 11.

Figure 10:
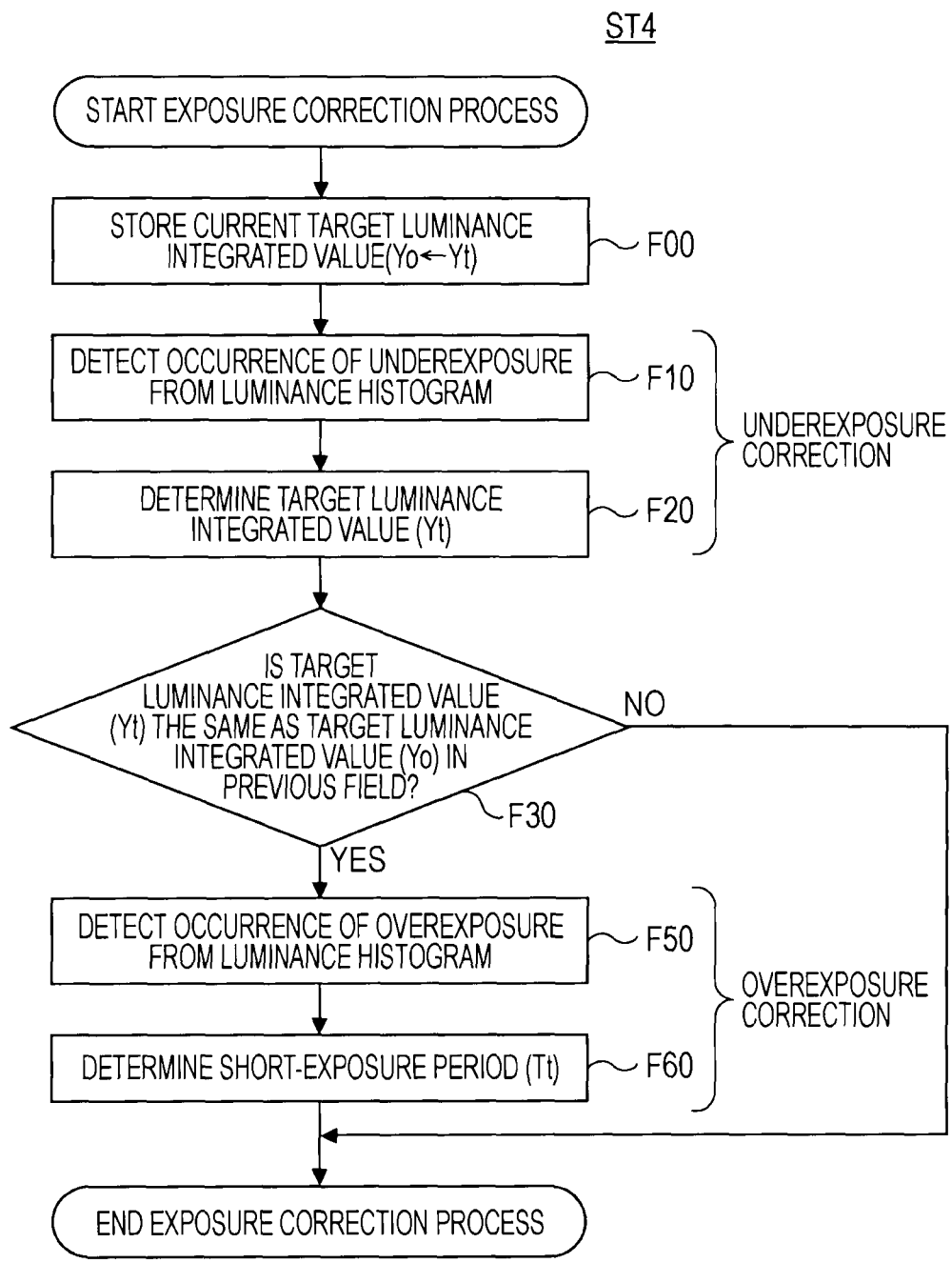
FIG. 10 is a flowchart illustrating another example of an exposure correction process according to an embodiment of the present invention.
Figure 11:
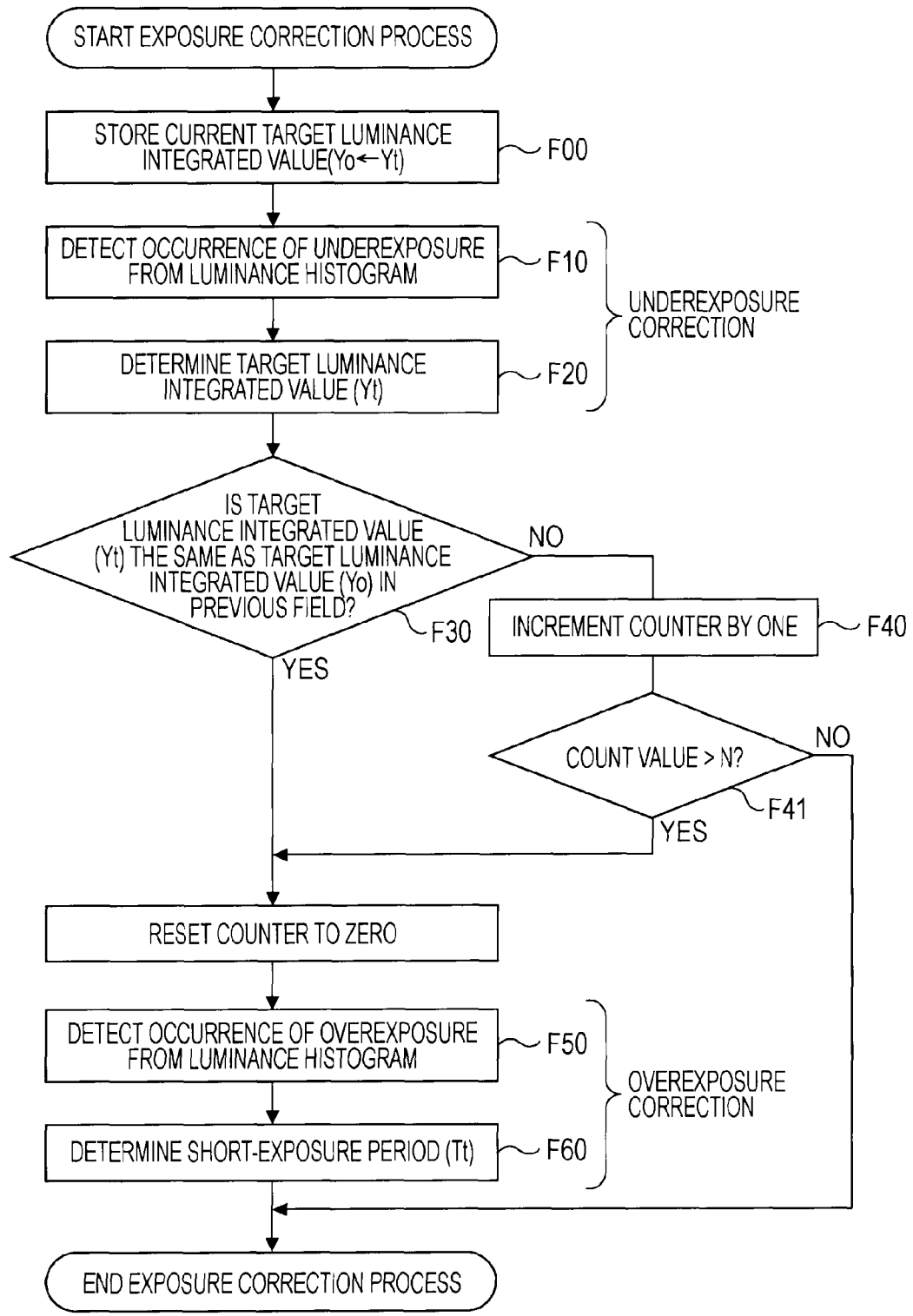
FIG. 11 is a flowchart illustrating still another example of an exposure correction process according to an embodiment of the present invention.

FIG. 10 illustrates exposure correction processing (processing performed in step ST4 illustrated in FIG. 4) for determining whether the exposure correction for elimination of an underexposed portion has been stably performed, performing the exposure correction for elimination of an underexposed portion when it has not been stably performed, and performing the exposure correction for elimination of an overexposed portion when it has been stably performed. In step ST4 illustrated in FIG. 4, the exposure correction processing is started. Subsequently, in step F00 illustrated in FIG. 10, the control unit 10 stores a current target luminance integrated value. That is, the control unit 10 stores the target luminance integrated value Yt set in the previous field period as a previous target luminance integrated value Yo. In steps F10 and F20, the underexposure correction described with reference to FIG. 8 is performed, whereby the target luminance integrated value Yt is determined.

In step F30, the control unit 10 determines whether the target luminance integrated value Yt is the same as the previous target luminance integrated value Yo. For example, in step F20, if the process proceeds to step F203 illustrated in FIG. 8, the target luminance integrated value Yt is the same as the previous target luminance integrated value Yo. On the other hand, in step F20, if the process proceeds to step F201 or F202 illustrated in FIG. 8, the target luminance integrated value Yt is different from the previous target luminance integrated value Yo. If it is determined in step F30 that the target luminance integrated value Yt is different from the previous target luminance integrated value Yo, the control unit 10 terminates the exposure correction process. That is, the process proceeds to step ST5 illustrated in FIG. 4 in which the exposure control processing is performed without performing the overexposure correction processing. In this case, in the exposure control processing in step ST5, the control unit 10 controls the long-exposure light quantity using the target luminance integrated value Yt and the current luminance integrated value, and does not control the short-exposure light quantity.

On the other hand, in step F30 illustrated in FIG. 10, if it is determined that the target luminance integrated value Yt is the same as the previous target luminance integrated value Yo, the control unit 10 performs in steps F50 and F60, for example, the overexposure correction processing described with reference to FIG. 9, thereby determining the short-exposure period Tt. Subsequently, the process proceeds to step ST5 illustrated in FIG. 4 in which the exposure control processing is performed. In this case, in the exposure control processing in step ST5, the control unit 10 controls the short-exposure light quantity using the short-exposure period Tt, and does not control the long-exposure light quantity.

Thus, if the process illustrated in FIG. 10 is performed in step ST4 illustrated in FIG. 4, first, the correction of the long-exposure light quantity is performed in each field period. After the long-exposure light quantity has been appropriately corrected, the correction of the short-exposure light quantity is performed. If the long-exposure light quantity has not been appropriately corrected, the correction of the long-exposure light quantity is performed until the long-exposure light quantity is converged to an appropriate long-exposure light quantity. In this case, the underexposure correction and the overexposure correction are not performed at the same time (in the same field period). Consequently, the luminance level of an output picture is gradually changed.

FIG. 11 illustrates a process that is developed from the process illustrated in FIG. 10, that is, a process of counting the number of times the underexposure correction was performed using a counter and performing overexposure correction every N (positive number) times on the basis of the result of the count so as to obtain an output picture including no underexposed portion and no over exposed portion more quickly. Referring to FIG. 11, the steps of F00, F10, F20, F30, F50, and F60 have already been described with reference to FIG. 10, and the steps of F40, F41, and F42 are newly added. If the control unit 10 determines in step F30 that the current target luminance integrated value Yt is different from the previous target luminance integrated value Yo, the control unit 10 increments an internal counter in step F40. In step F41, the control unit 10 determines whether the count value exceeds a predetermined value N. If it is determined in step F41 that the count value does not exceed the predetermined value N, the control unit 10 terminates the exposure correction process. On the other hand, if it is determined in step F41 that the count value exceeds the predetermined value N, the control unit 10 resets the counter to zero in step F42, and performs the overexposure correction in steps F50 and F60. By performing this process illustrated in FIG. 11, even if the long-exposure light quantity is not stable, the correction of the long-exposure light quantity is continuously performed for an N-field period and then the correction of the short-exposure light quantity is performed. That is, the overexposure correction is automatically performed after the N-field period has elapsed. Accordingly, even if it takes too long to complete the underexposure correction, such a situation can be prevented in which the overexposure correction cannot be started.

6. Another Example of Underexposure Correction

As an example of the underexposure correction (steps F10 and F20 illustrated in FIG. 7, 10, or 11) included in the exposure correction processing performed in step ST4 illustrated in FIG. 4, the process illustrated in FIG. 8 has been described. Another example of the underexposure correction will be described with reference to FIGS. 12 and 13.

Figure 12:
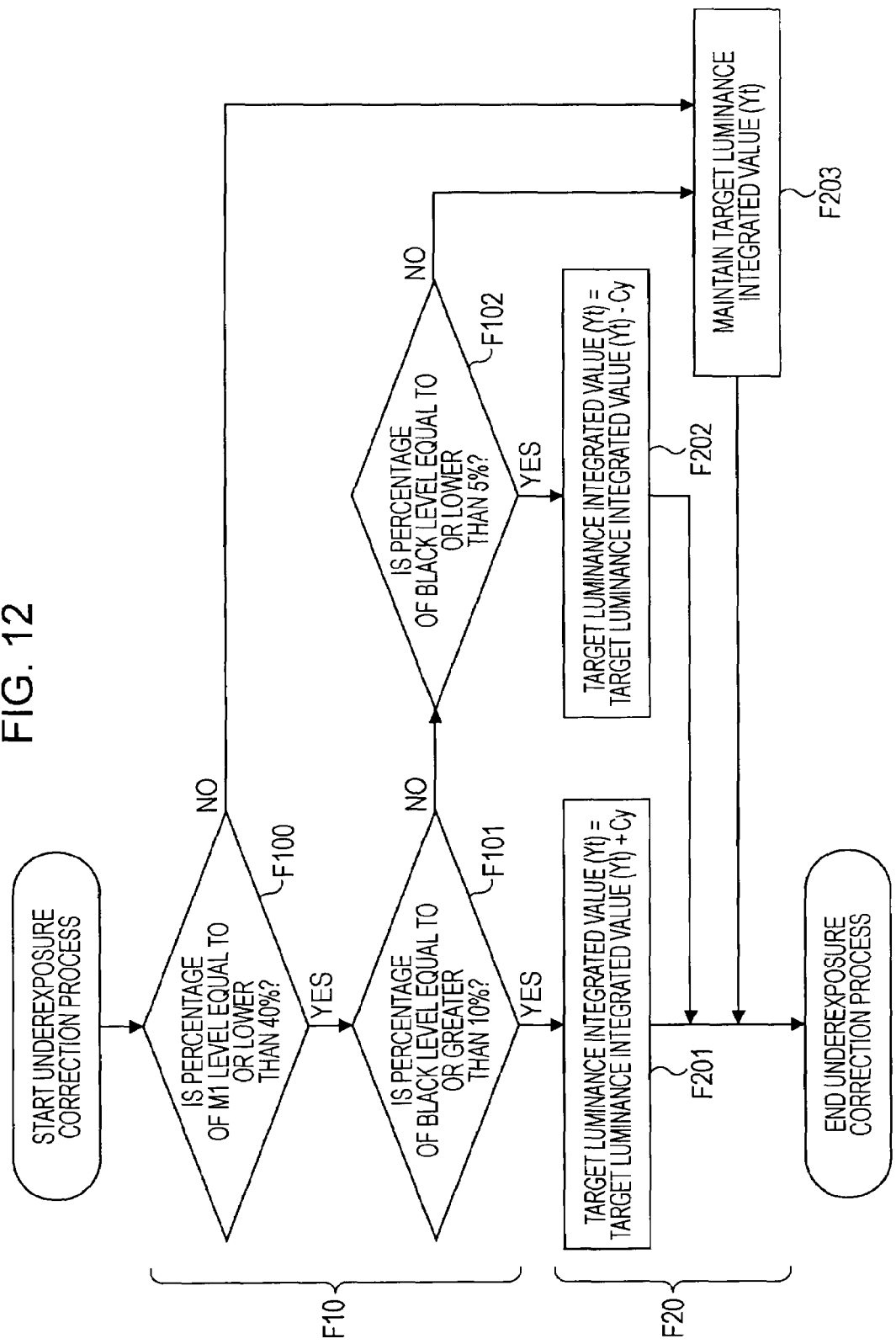
FIG. 12 is a flowchart illustrating another example of an underexposure correction process according to an embodiment of the present invention.

In the underexposure correction illustrated in FIG. 12, the intermediate luminance level of the luminance histogram is also used for the setting of the target luminance integrated value Yt. Referring to FIG. 12, in step F100, the control unit 10 determines whether the percentage of an M1 level is equal to or lower than 40% in the luminance histogram. The M1 level corresponds to the mb1, mb2, and mb3 levels (that is, the lower luminance side of the intermediate luminance level). That is, it is determined whether the total of the percentages of the mb1, mb2, and mb3 levels exceeds 40%. If the underexposure correction is performed when the percentage of the M1 level, which is the intermediate luminance level, is high in a captured image, there is a possibility that overexposure newly occurs. Accordingly, in this case, no correction is performed. That is, if the percentage of the M1 level exceeds 40%, the process proceeds to step F203 in which the target luminance integrated value Yt is maintained. On the other hand, if the percentage of the M1 level is equal to or lower than 40%, the process proceeds to step F101. The descriptions of steps F101, F102, F201, F202, and F203 have been made with reference to FIG. 8. By performing this process illustrated in FIG. 12, such a situation can be prevented in which overexposure newly occurs due to the underexposure correction.

Figure 13:
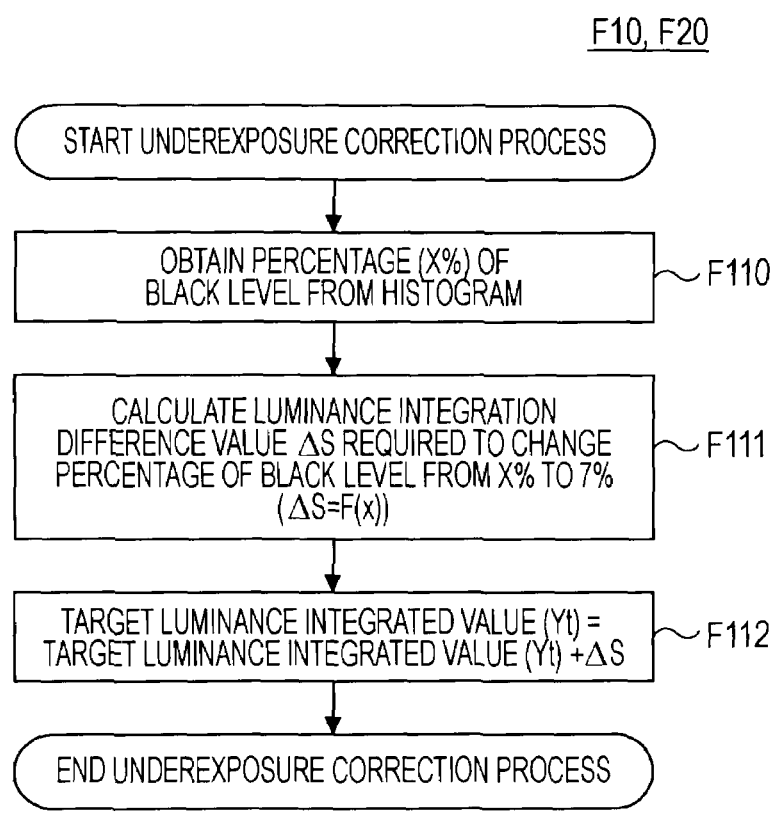
FIG. 13 is a flowchart illustrating still another example of an underexposure correction process according to an embodiment of the present invention.

FIG. 13 illustrates still another example of the underexposure correction. In this example illustrated in FIG. 13, first, in step F110, the control unit 10 obtains the percentage (X %) of the black level (B) in the luminance histogram. In step F111, the control unit 10 calculates a luminance integration difference value ΔS required to change the percentage of the black level (B) from X % to 7%. The luminance integration difference value ΔS is a correction value for the target luminance integrated value Yt which is required to change the percentage of the black level (B) from X % to 7%, and is obtained from the percentage (X %) of the black level (B) using a function F. The percentage of 7% is an exemplary setting value of an appropriate percentage of the black level (B). Subsequently, in step F112, the control unit 10 updates the target luminance integrated value Yt with a value obtained by adding the luminance integration difference value ΔS to the current target luminance integrated value Yt.

As described previously, by calculating the luminance integration difference value ΔS as a difference value used for the convergence of the target luminance integrated value Yt and setting a new target luminance integrated value Yt obtained by performing computation using the current target luminance integrated value Yt and the luminance integration difference value ΔS, the target luminance integrated value Yt that should be converged with a single processing operation can be obtained. Consequently, it is possible to speed up the underexposure correction.

7. Another Example of Overexposure Correction

As an example of the overexposure correction (steps F50 and F60 illustrated in FIG. 7, 10, or 11) included in the exposure correction processing performed in step ST4 illustrated in FIG. 4, the process illustrated in FIG. 9 has been described. Another example of the underexposure correction will be described with reference to FIGS. 14 and 15.

Figure 14:
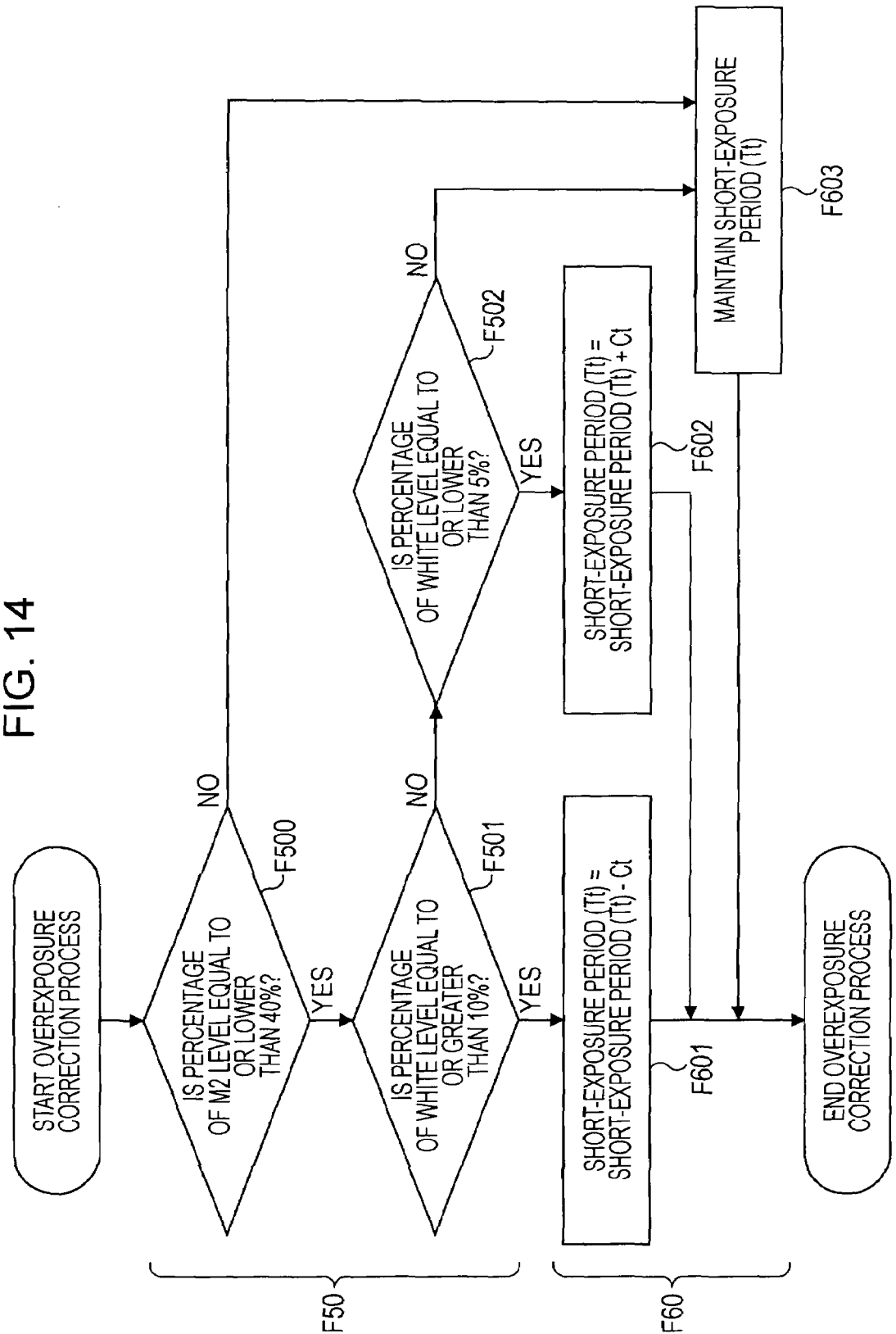
FIG. 14 is a flowchart illustrating another example of an overexposure correction process according to an embodiment of the present invention.

In the overexposure correction illustrated in FIG. 14, the intermediate luminance level of the luminance histogram is also used for the setting of the short-exposure period Tt. Referring to FIG. 14, in step F500, the control unit 10 determines whether the percentage of an M2 level is equal to or lower than 40% in the luminance histogram. The M2 level corresponds to the mw1, mw2, and mw3 levels (that is, the higher luminance side of the intermediate luminance level). That is, it is determined whether the total of the percentages of the mw1, mw2, and mw3 levels exceeds 40%. If the overexposure correction is performed when the percentage of the M2 level, which is the intermediate luminance level, is high in a captured image, there is a possibility that underexposure newly occurs. Accordingly, in this case, no correction is performed. That is, if the percentage of the M2 level exceeds 40%, the process proceeds to step F603 in which the short-exposure period Tt is maintained. On the other hand, if the percentage of the M2 level is equal to or lower than 40%, the process proceeds to step F501. The descriptions of steps F501, F502, F601, F602, and F603 have been made with reference to FIG. 9. By performing this process illustrated in FIG. 14, such a situation can be prevented in which underexposure newly occurs due to the overexposure correction.

Figure 15:
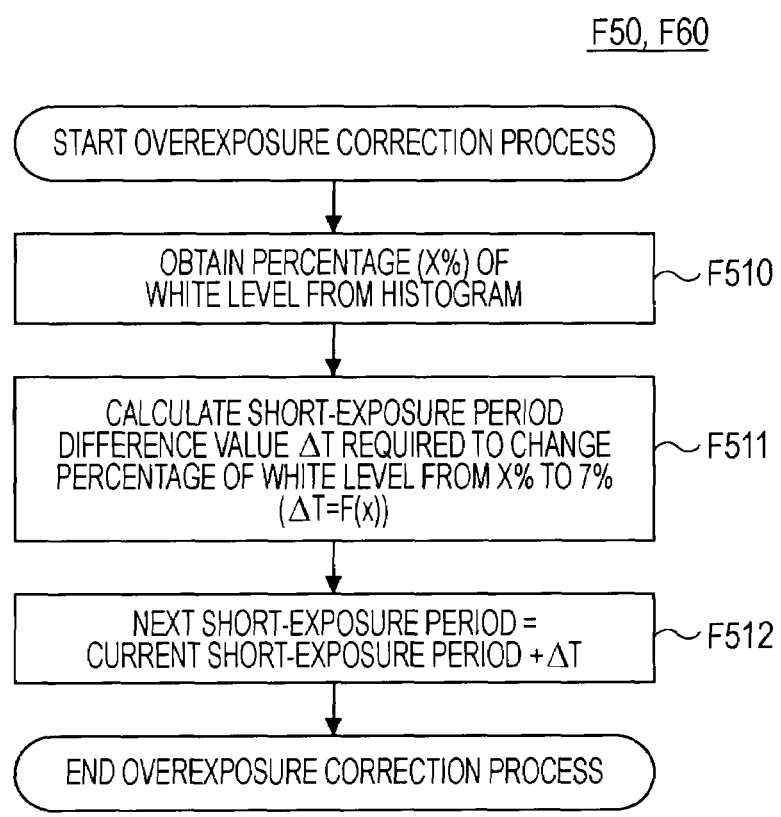
FIG. 15 is a flowchart illustrating sill another example of an overexposure correction process according to an embodiment of the present invention.

FIG. 15 illustrates still another example of the overexposure correction. In this example illustrated in FIG. 15, first, in step F510, the control unit 10 obtains the percentage (X %) of the white level (W) in the luminance histogram. In step F511, the control unit 10 calculates a short-exposure period difference value ΔT required to change the percentage of the white level (W) from X % to 7%. The short-exposure period difference value ΔT is a correction value for the short-exposure period Tt which is required to change the percentage of the white level (W) from X % to 7%, and is obtained from the percentage (X %) of the white level (W) using a function F. The percentage of 7% is an exemplary setting value of an appropriate percentage of the white level (W). Subsequently, in step F512, the control unit 10 updates the short-exposure period Tt with a value obtained by adding the short-exposure period difference value ΔT to the current short-exposure period Tt.

As described previously, by calculating the short-exposure period difference value ΔT as a difference value used for the convergence of the short-exposure period Tt and setting a new short-exposure period Tt obtained by performing computation using the current short-exposure period Tt and the short-exposure period difference value ΔT, the short-exposure period Tt that should be converged with a single processing operation can be obtained. Consequently, it is possible to speed up the overexposure correction.

8. Effect of Embodiment and Program

According to an embodiment of the present invention, it is determined whether an overexposed portion and an underexposed portion are included in a combined image using the luminance integrated value and luminance histogram of the combined image. If it is determined that the overexposed portion and the underexposed portion are included in the combined image, automatic exposure control is performed so as to eliminate these portions. Thus, the image quality of a combined image can be improved. That is, the quality of a picture output to a monitor display can be improved. A user can feel the improvement of the quality of the image displayed on the monitor display. The important factor in choosing a wide dynamic range camera is not only the numerical value of a dynamic range but also the quality of a final picture. Accordingly, the ability to optimize a final image is a big advantage for wide dynamic range cameras.

Furthermore, in the case of an exposure correction control method according to an embodiment of the present invention, the dependence on the signal combination method performed by the signal processing unit 4 for generating a combined image, which is included in a wide dynamic range camera, is extremely weak and various types of signal processing units can therefore be used. Furthermore, the dependence on a signal combination time (images with two different light quantities of exposure are obtained every one field or two fields) is also weak. Accordingly, the dependence on the entire apparatus is decreased, and an exposure correction control method according to an embodiment of the present invention can therefore be applied to more wide dynamic range camera systems. Still furthermore, the detection unit 6 processes a combined image signal. That is, only a single detection unit is required, and a detection unit is not required for each of the long-exposure image signal and the short-exposure image signal. As a result, the simplification of an apparatus can be achieved.

An embodiment of the present invention can be applied to a camera system for capturing a moving image. However, an embodiment of the present invention may be applied to a camera system for capturing a still image. Even in the case of image capturing of a still image, the above-described exposure correction control may be performed in each field period during monitoring before an image capturing is performed. For example, if image capturing is performed using the non-interlaced scanning method, the above-described process performed in each field period may be considered as a process performed in each frame period. It is needless to say that a unit period of an image signal may be variously considered as a field period, a frame period, a plurality of field periods, and a plurality of frame periods regardless of a scanning method used. For example, an exemplary case can be considered in which the detection processing, the exposure correction processing, and the exposure control processing are performed every few frame periods.

A program according to an embodiment of the present invention is a program corresponding to the processing performed by the control unit 10. That is, a program according to an embodiment of the present invention is a program causing the control unit 10 that is a microcomputer (processor) to perform various processes illustrated in FIGS. 7 to 15. Such a program can be recorded in advance in an HDD that is a recording medium included in, for example, a personal computer or an image pickup apparatus, or a ROM or flash memory included in a microcomputer having a CPU. Alternatively, the program may be temporarily or permanently stored (recorded) on a removal recording medium such as a flexible disk, a CD-ROM (Compact Disc-Read-Only Memory), an MO (Magneto-Optical) disk, a DVD (Digital Versatile Disc), a blue-ray disc, a magnetic disk, a semiconductor memory, or a memory card. Such a removable recording medium may be obtained as package software. A program according to an embodiment of the present invention may be installed from the removable recording medium on a personal computer, or may be transferred from a download site to the personal computer via a network such as a LAN (Local Area Network) or the Internet.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus comprising:
    an image pickup unit configured to generate a long-exposure image signal and a short-exposure image signal from incident light and output the long-exposure image signal and the short-exposure image signal as image pickup signals, the long-exposure image signal being generated by a long exposure period and the short-exposure image signal being generated by a short exposure period, the long exposure period being longer than the short exposure period;
    a signal processing unit configured to generate a combined image signal by combining the long-exposure image signal and the short-exposure image signal based on a predetermined pixel value switching point, the combined image signal having pixel values less than the predetermined pixel value switching point and greater than the predetermined pixel value switching point, and having a dynamic range that is wider than that of at least any one of the long-exposure image signal and the short-exposure image signal;
    a detection unit configured to obtain a luminance integrated value of the combined image signal and to generate a luminance histogram of the combined image signal; and
    a control unit configured to perform exposure correction control for the image pickup unit based on the luminance integrated value and the luminance histogram.

2. The image pickup apparatus according to claim 1, wherein the control unit detects occurrence of underexposure in the combined image signal using the luminance histogram, sets a target luminance integrated value on the basis of a detection result, and performs the exposure correction control for the image pickup unit using the target luminance integrated value.

3. The image pickup apparatus according to claim 2, wherein the control unit performs the exposure correction control for the long-exposure image signal generated by the image pickup unit using the target luminance integrated value.

4. The image pickup apparatus according to claim 3, wherein the control unit performs iris correction, long-exposure period correction, or gain correction for the long-exposure image signal as the exposure correction control for the long-exposure image signal.

5. The image pickup apparatus according to claim 2, wherein the control unit sets a new target luminance integrated value by performing computation using a current target luminance integrated value and a fixed value.

6. The image pickup apparatus according to claim 2, wherein the control unit calculates a difference value required to obtain a convergence target value of the target luminance integrated value, and sets a new target luminance integrated value by performing computation using the current target luminance integrated value and the difference value.

7. The image pickup apparatus according to claim 2,
wherein the detection unit classifies each of luminance levels of the luminance histogram into a black level, an intermediate level, or a white level and generates luminance distribution information about each of these levels, and
wherein the control unit uses the luminance distribution information about the intermediate level for setting of the target luminance integrated value.

8. The image pickup apparatus according to claim 1, wherein the control unit detects occurrence of overexposure in the combined image signal using the luminance histogram, sets a short-exposure period on the basis of a detection result, and performs the exposure correction control for the short-exposure image signal generated by the image pickup unit using the short-exposure period.

9. The image pickup apparatus according to claim 8, wherein the control unit sets a new short-exposure period by performing computation using a current short-exposure period and a fixed value.

10. The image pickup apparatus according to claim 8, wherein the control unit calculates a difference value required to obtain a convergence target value of the short-exposure period, and sets the new short-exposure period by performing computation using the current short-exposure period and the difference value.

11. The image pickup apparatus according to claim 8,
wherein the detection unit classifies each of luminance levels of the luminance histogram into a black level, an intermediate level, or a white level and generates luminance distribution information about each of these levels, and
wherein the control unit uses the luminance distribution information about the intermediate level for setting of the short-exposure period.

12. The image pickup apparatus according to claim 1, wherein the control unit performs both of the exposure correction control for elimination of an underexposed portion and the exposure correction control for elimination of an overexposed portion in each image signal unit period.

13. The image pickup apparatus according to claim 1, wherein the control unit performs any one of the exposure correction control for elimination of an underexposed portion and the exposure correction control for elimination of an overexposed portion in each image signal unit period.

14. The image pickup apparatus according to claim 13, wherein the control unit determines whether an exposure correction operation for elimination of an underexposed portion has been stably performed in each image signal unit period, performs the exposure correction control for elimination of an underexposed portion when it is determined that the exposure correction operation has not been stably performed, and performs the exposure correction control for elimination of an overexposed portion when it is determined that the exposure correction operation has been stably performed.

15. The image pickup apparatus according to claim 13, wherein the control unit counts the number of times the exposure correction control for elimination of an underexposed portion was performed, and performs the exposure correction control for elimination of an overexposed portion when the counted number exceeds a predetermined number.

16. The image pickup apparatus according to claim 1, wherein the combined image signal includes pixels from the long-exposure image signal below the predetermined pixel value switching point and pixels from the short-exposure image signal above the predetermined pixel value switching point.

17. The image pickup apparatus according to claim 1, wherein the predetermined pixel value switching point is a luminance value.

18. An image pickup method, implemented as an image processing apparatus, comprising:
generating a long-exposure image signal by exposure for a long period and a short-exposure image signal by exposure for a short period, the long period being longer than the short period, from incident light transmitted from a subject so as to output the long-exposure image signal and the short-exposure image signal as image pickup signals;
generating a combined image signal by combining the long-exposure image signal and the short-exposure image signal based on a predetermined pixel value switching point, the combined image signal having pixel values less than the predetermined pixel value switching point and greater than the predetermined pixel value switching point, and having a dynamic range that is wider than that of at least any one of the long-exposure image signal and the short-exposure image signal;
obtaining a luminance integrated value of the combined image signal and generating a luminance histogram of the combined image signal; and
performing exposure correction control based on the luminance integrated value and the luminance histogram.

19. An exposure correction method for an image pickup apparatus for obtaining a long-exposure image signal by exposure for a long period and a short-exposure image signal by exposure for a short period, the long period being longer than the short period, generating a combined image signal with a dynamic range that is wider than that of at least any one of the long-exposure image signal and the short-exposure image signal by combining the long-exposure image signal and the short-exposure image signal based on a predetermined pixel value switching point, and outputting the generated combined image signal, the exposure correction method comprising:
obtaining a luminance integrated value of the combined image signal and generating a luminance histogram of the combined image signal, the combined image signal including pixel values less than the predetermined pixel value switching point and greater than the predetermined pixel value switching point;
detecting occurrence of underexposure in the combined image signal from the luminance histogram;
setting a target luminance integrated value on the basis of a detection result of the occurrence of the underexposure;

detecting occurrence of overexposure in the combined image signal from the luminance histogram;

setting a short-exposure period on the basis of a detection result of the occurrence of the overexposure; and performing exposure correction control using the target luminance integrated value and the short-exposure period.

20. A non-transitory computer readable storage medium having stored thereon a computer program that includes instructions for causing an image pickup apparatus to execute exposure correction, the image pickup apparatus being configured to obtain a long-exposure image signal by exposure for a long period and a short-exposure image signal by exposure for a short period, generate a combined image signal with a dynamic range that is wider than that of at least any one of the long-exposure image signal and the short-exposure image signal by combining the long-exposure image signal and the short-exposure image signal based on a predetermined pixel value switching point, and output the generated combined image signal, which when executed by the image pickup apparatus causes a processor to perform an exposure correction method comprising:

obtaining a luminance integrated value of the combined image signal and generating a luminance histogram of the combined image signal, the combined image signal including pixel values less than the predetermined pixel value switching point and greater than the predetermined pixel value switching point;

detecting occurrence of underexposure in the combined image signal from the luminance histogram;

setting a target luminance integrated value on the basis of a detection result of the occurrence of the underexposure;

detecting occurrence of overexposure in the combined image signal from the luminance histogram;

setting a short-exposure period on the basis of a detection result of the occurrence of the overexposure; and performing exposure correction control using the target luminance integrated value and the short-exposure period.

\* \* \* \* \*